Dec. 22, 1953  A. B. LANCASTER  2,663,242
MECHANICAL SOD CUTTER AND LOADER
Filed July 18, 1950  4 Sheets-Sheet 1

Archie B. Lancaster
INVENTOR.

Dec. 22, 1953  A. B. LANCASTER  2,663,242
MECHANICAL SOD CUTTER AND LOADER
Filed July 18, 1950

Archie B. Lancaster
INVENTOR.

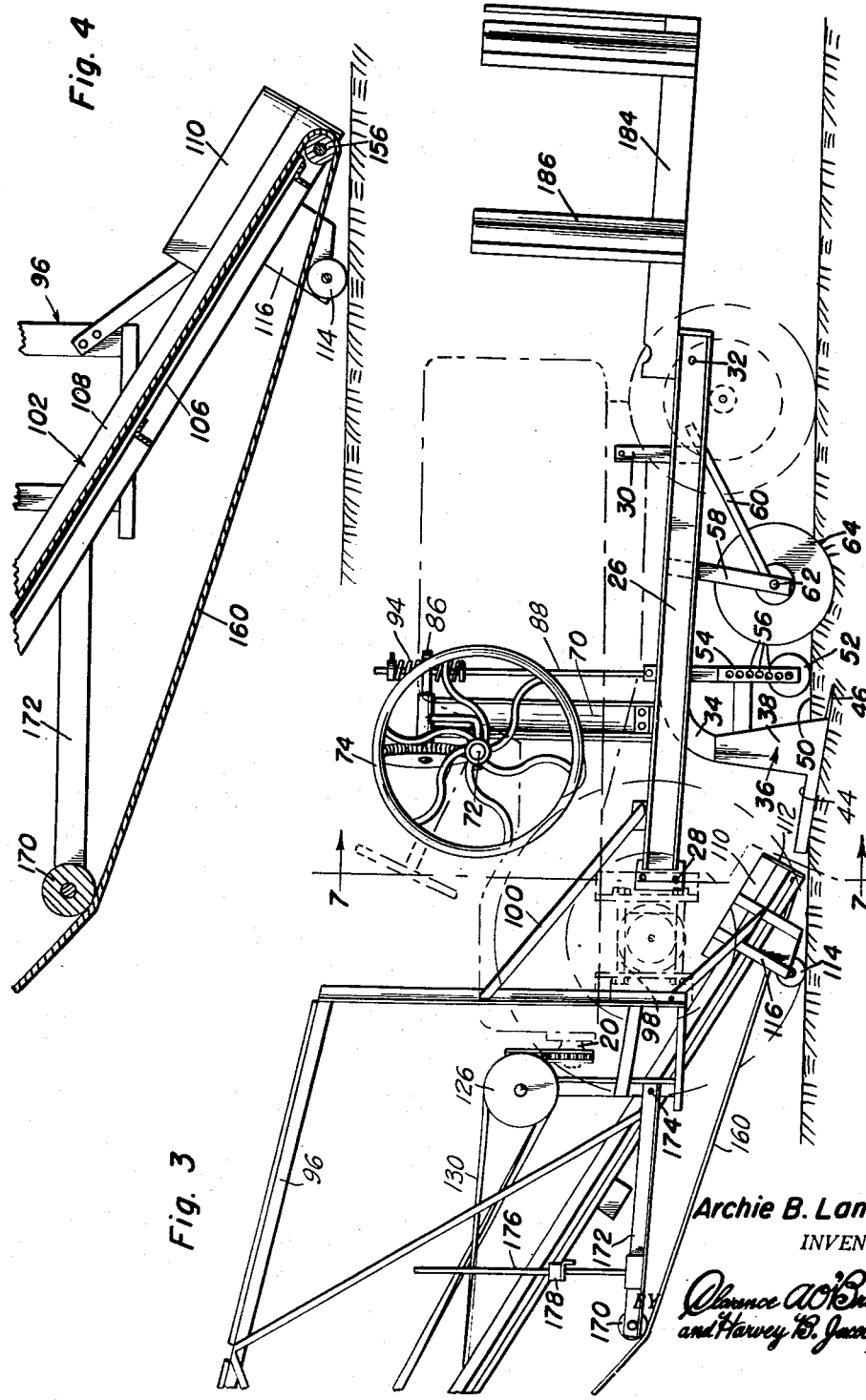

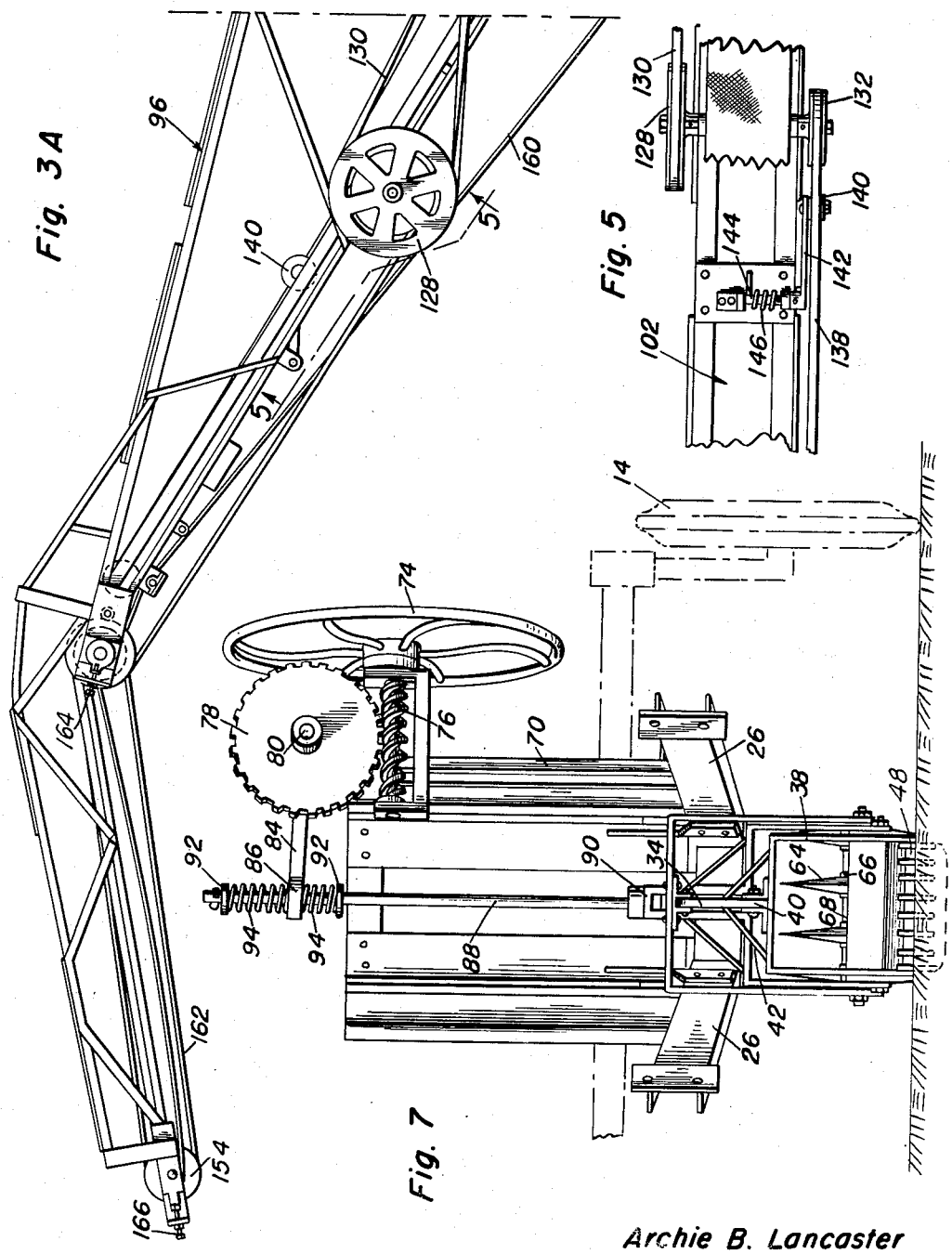

Patented Dec. 22, 1953

2,663,242

UNITED STATES PATENT OFFICE 2,663,242

MECHANICAL SOD CUTTER AND LOADER

Archie B. Lancaster, Duck Hill, Miss.

Application July 18, 1950, Serial No. 174,533

3 Claims. (Cl. 97—226)

This invention relates to new and useful improvements in sod cutting machines and loaders therefor.

The primary object of this invention is to cut sod into strips of a selected width and predetermined thickness and to place the same in a position for ready transport to a place of immediate application or storage.

Another important object in accordance with the preceding object is to so cut and place the sod for transit that the same will be in excellent condition when subjected to a minimum amount of rough treatment, particularly at the time the same is severed from the soil.

Another important object of this invention is to provide a machine of this character which will be capable of attaining sod from an undulating surface and which sod will be of uniform thickness.

A further object of this invention is to provide a machine of this character, which will leave the soil from which sod has been severed in good condition, and as little subject to erosion as possible before a new turf presents itself.

A further object of this invention is to provide a machine of this character which will be capable of realizing the foregoing objects, and which may take the convenient and economical form of an attachment for conventional tractors.

Still another object of this invention is to enable the machine operator to efficaciously determine the thickness of the cut and also permit the operator to place the machine in condition for cross-country transit to and from the area of sod cutting.

A meritorious feature of the present invention resides in the plow fork being pivotally mounted upon the tractor and the means for resiliently retaining the plow fork in a vertically adjusted position.

Another important feature of the present invention resides in the relation of the plow and the depth adjusting roller, in that the roller is positioned immediately above the leading edge of the plow, so that the pressure of the roller prevents the sod from breaking immediately above the plow point.

A further important feature of the present invention resides in the provision of the inclined conveyor, the lower forward end of which has its side walls enlarged and diverged to constitute training walls for sod received from the rear end of the rearwardly and upwardly inclined plow bed.

Yet another important feature of the present invention resides in the provision of a trim roller at the forward lower end of the conveyor for dressing the soil surface after the sod has been severed therefrom.

A final important feature to be specifically enumerated herein resides in the means for adjustably tensioning both the drive belt and the conveyor belt, and the simple and convenient means provided in the machine for driving the conveyor belt from the conventional power take-off of the tractor.

These, together with various ancillary features and objects of the invention, which will later become apparent as the following description proceeds, are realized by the present invention, one embodiment of which has been illustrated, by way of example only, in the accompanying drawings, wherein:

Figure 1 is a schematic side elevational view of the present invention;

Figures 2 and 2a together constitute a top plan view upon an enlarged scale of the complete machine, the tractor being shown in dotted outline;

Figures 3 and 3a together constitute a side elevational view upon an enlarged scale of the complete machine, the tractor being shown in dotted outline;

Figure 4 is an enlarged longitudinal vertical sectional view of the forward end of the loader taken upon the plane of the section line 4—4 of Figure 2;

Figure 5 is a detail view of the arrangement of one of the idler pulleys and is taken from the plane of the broken line 5—5 of Figure 3a;

Figure 6 is a diagrammatic view of the conveyor belt driving assembly;

Figure 7 is an elevational view of the machine taken upon the plane of the broken line 7—7 of Figure 3.

Figure 1:
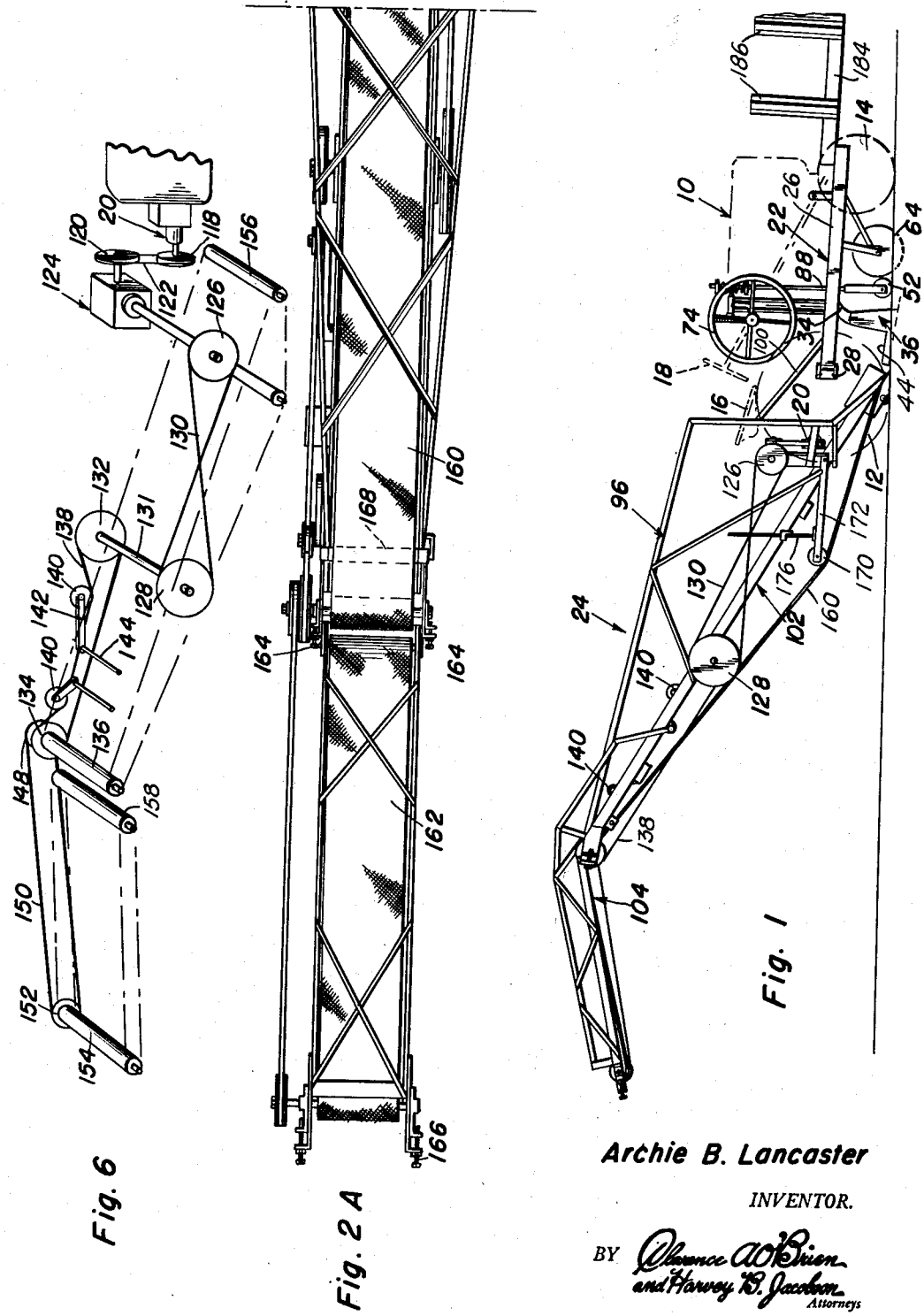

Reference is now made more specifically to the accompanying drawings, wherein like numerals designate similar parts throughout the various views, and in which a conventional tractor is indicated at 10 which includes driving wheels 12, dirigible wheels 14, driver's seat 16, steering wheel 18, and which tractor 10 is conventionally equipped with a power take-off designated at 20.

The present invention comprises broadly a sod cutter assembly 22 and a sod loader assembly 24, each of which is adapted to be mounted upon and actuated by the tractor 10.

The sod cutter assembly 22 comprises a pair of forwardly converging side rails 26 which are disposed upon opposite sides of the tractor 10 and which are secured at their rear ends by bolts 28 or other suitable means to the frame of a tractor 10, while adjacent the forward ends of the rails 26 the same are secured to the tractor frame by means of the straps 30. The rails 26 constitute what will hereinafter be referred to as the plow frame.

Figure 2:
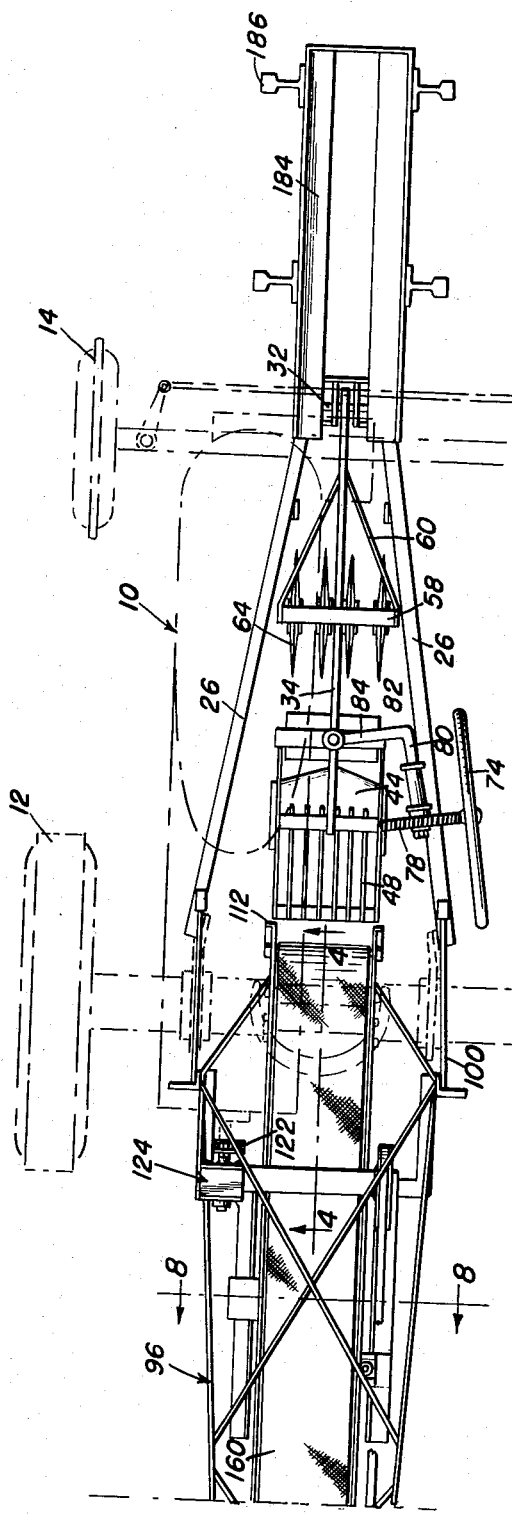

As clearly shown in Figure 2, the forward ends of the rails 26 are disposed between the dirigible wheels 14 and connecting the forward ends of the rails 26 is a transverse axle 32. Pivoted at its forward end upon the axle 32 and extending rearwardly beneath the frame of the tractor 10 is a plow fork 34, which, adjacent its rearmost end is curved downwardly and is attached to a plow designated generally at 36. As shown best in Figures 2, 3 and 7, the plow 36 comprises an inverted U-shaped frame member 38 secured to the rear end of the plow fork 34 as at 40 and braced, as at 42, to the plow fork 34 for rigidity. At the lower extremities of the inverted U-shaped frame 38 is a plow bed 44 which is substantially elongated and provided with a V-shaped point 46 at its forward end and longitudinal slots 48 at its rearmost end, the plow bed 44 being upwardly and rearwardly inclined, as clearly shown in the drawings for a purpose to become readily apparent.

In order to limit the vertical penetration of the plow point 46 into the surface of the ground indicated at 50, a gauge roller 52 is provided which is carried by a roller fork 54. The roller fork 54 is secured to the plow fork 34 adjacent its rearmost end and is provided with a plurality of spaced openings 56, whereby the roller 52 may be adjusted vertically with respect thereto. It is to be particularly noted that the roller 52 is spaced vertically immediately above the leading edge of the point 46, so that the roller 52, by bearing upon the sod immediately at the point of severance from the soil, prevents the sod breaking at this critical point, it being readily apparent that by means of the adjustability of the roller 52 with respect to the frame 54 the depth of cut by the plow may be accurately gauged.

In order to sever the sod in strips of the desired transverse width, a disk frame 58 is suitably secured to the plow fork 34 in advance of the roller 52 and intermediate the ends of the plow fork 34, which frame 58 is preferably braced by member 60. The frame 58 carries an axle 62 upon which are adjustably positioned a plurality of rotary cutting disks 64, which disks 64 may be adjustably positioned on the axle 62 by any suitable means, not shown, in their hub 66 such as set screws or the like, or by the use of tubular spacers 68 of varying axial length suitably interposed between the disks 64. It will be understood that any suitable number of disks 64 may be used, the number chosen being dependent solely upon the width of the strips and the number of the same desired by the operator.

Since the plow 36, the roller 52, and the cutting disks 64 are all carried by the plow fork 34, it will be readily apparent that by vertical movement of the plow fork 34 about the axle 32 the same may all be simultaneously raised or lowered out of or into engagement with the sod as desired, thus providing a convenient means whereby the operator may raise all these elements simultaneously when moving to or from a sod-cutting area or at any time it is desired that the same be inoperative. In order to provide means for the operator to raise and lower the plow fork 34, one of the rails 26 is provided with an upstanding post 70 adjacent the rearmost end of the plow fork 34. Journaled on the upper end of the post 70 is a transverse shaft 72 provided with a hand operating wheel 74, which shaft 72 is provided with a gear 76 that cooperates with a gear 78 mounted upon a longitudinal shaft 80 that is also journaled upon the upper end of the post 70. As best shown in Figures 2, 3 and 7, the shaft 80 is bent at right angles at 82 to provide a transverse extension 84 that terminates at its outer end in a tubular element 86 that slidably receives the upper end of a vertically disposed operating rod 88. The lower end of the operating rod 88 is suitably secured to the plow fork 34 as at 90, and the rod 88 is also provided with spaced stop collars 92 disposed on opposite sides of the tubular element 86. In order to provide a resilient connection between the tubular element 86 and the rod 88, compression springs 94 are seated between the stop collars 92 and the tubular element 86. It will be evident that an operator of the machine may raise or lower the tubular element 86 as desired by rotation of the hand operating wheel 74 to adjustably position the plow fork 34 vertically, and that the plow fork 34 will be resiliently retained in such vertically adjusted position, the springs 94 serving as a yielding means for preventing damage to the entire sod-cutting assembly 22 and also permitting the roller 52 to readily conform to the undulations of the ground surface.

The sod loader assembly 24 comprises a frame 96 suitably secured to the tractor frame by bolts 98 and braces 100 secured to the rear ends of the rails 26. Suitably secured to the frame 96 is a pair of conveyor troughs indicated generally at 102 and 104, the former of which is upwardly and rearwardly inclined from the rear of the tractor 10, while the latter is rearwardly and downwardly inclined from the upper rear end of the first-mentioned conveyor trough 102. The conveyor trough 102 includes a bottom wall 106 and side walls 108. As clearly shown in Figures 3 and 4, the lower forward end of the trough 102 is disposed rearwardly of the plow 36 and is in substantial alignment with the bed of the plow 36 so that sod raised by the plow may be readily received within the trough 102. The side walls 108 adjacent the lower end of the trough 102 are enlarged as at 110 and outwardly flared as at 112 to constitute a training wall for sod received from the plow. A trim roller 114 is carried by brackets 116 adjacent the lowermost end of the trough 102 in order to dress down the surface of the soil after sod has been severed therefrom.

Attention is particularly directed to Figure 6 for a ready understanding of the operation of the loader assembly 24. The power take-off 20, by means of sprockets 118 and 120 through a drive chain 122, drives a suitable gear reduction assembly indicated generally at 124, the output of which gear reduction assembly 124 is transmitted through a transverse shaft on the frame 96 to a pulley 126, which pulley 126 drives a second pulley 128 through a crossed belt 130. The pulley 128 is secured on one end of a second transverse shaft 131, which shaft 131 has a pulley 132 at its other end. The pulley 132, in turn, drives a further pulley 134 secured on one end of a drive roller 136 carried at the upper end of the trough 102, the pulleys 132 and 134 being connected by a drive belt 138 entrained thereover. As thus far described, it will be readily seen that the drive roller 136 may be driven by means of the tractor power take-off 20.

A pair of idler pulleys 140 are provided for tensioning the drive belt 138. As best shown in Figure 5, each of the idler pulleys 140 is carried at the outer end of arms 142 that extend laterally from transverse shafts 144 journaled on the under side of the trough 102. A coil torsion spring 146 is disposed about each of the shafts 144, having one end secured thereto and the other end adapted to seat against the under side of the trough so as to urge the idler pulleys 140 downwardly to bear against the upper flight of the drive belt 138.

A second pulley 148 is carried by the drive roller 136 adjacent the pulley 134, which pulley 148, through a drive belt 150, drives a further pulley 152 carried by a second drive roller 154 carried at the lower and outer end of the trough 104, whereby both the drive rollers 136 and 154 may be driven simultaneously by the power take-off 20.

As shown in Figures 2A, 4 and 6, idler rollers 156 and 158 are disposed respectively at the forward end of the trough 102 and at the forward end of the trough 104, conveyor belts 160 and 162 being provided with the former being entrained over the drive roller 136 and the idler roller 156 and the latter entrained over the drive roller 154 and the idler roller 158. As best shown in Figure 2A, each of the drive rollers 136 and 154 are adjustable to vary the tension in the conveyor belts 160 and 162, the means provided consisting of adjustment screws 164 for the drive roller 136 and adjustment screws 166 for the drive roller 154, the arrangement being such that by turning of the adjustment screws the respective drive rollers may be shifted longitudinally of the frame 96 in slots, not shown, in the side of the troughs 102 and 104.

As best shown in Figures 3 and 3A, further means are provided for tensioning the conveyor belt 160, which means takes the form of a tension roller 168 disposed transversely below the upper end of the trough 102, over which the lower flight of the conveyor belt 160 is entrained. A further idler roller 170 is disposed below the trough 102 intermediate its ends, which idler roller 170 is journaled between the outer ends of a pair of arms 172, the inner ends of which arms 172 are pivoted to the frame 96 as at 174, the pivotal position of the arms 172 being controlled by upstanding adjustment rods 176 connected to the arms 172 intermediate their ends. Any suitable means may be provided for vertically adjusting the rod 176, such as by threaded adjustment of a nut 178 on the rod 176, which nut 178 bears upon a suitable bracket carried by the frame 96. As clearly shown in the drawings, the conveyor belt 160 is entrained under the idler roller 170 and over the tension roller 168, the arrangement being such that either by means of the rods 176 or the screws 164, the conveyor belt 160 may be readily and adjustably tensioned.

Figure 8:
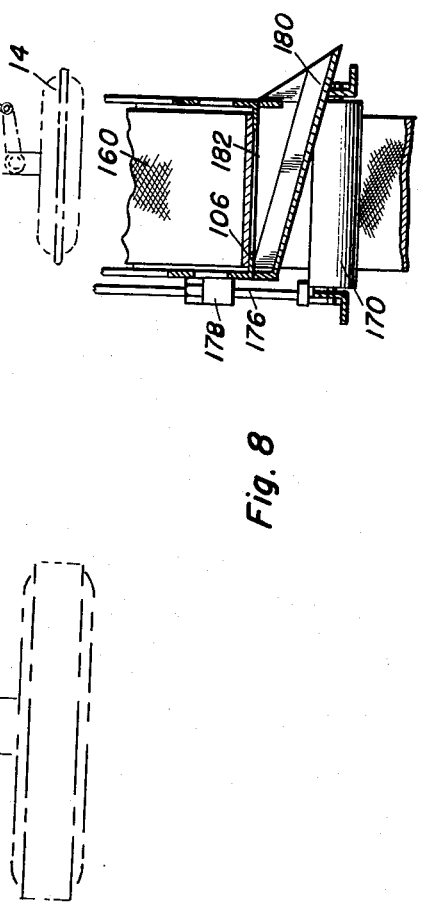
Figure 8 is a transverse vertical sectional detail view taken upon the plane of the section line 8—8 of Figure 2.

In order to avoid undue wear on the conveyor belt 160 and possible interference with the operation of the same due to soil and dirt falling from the sod to be conveyed up the trough 102, means shown best in Figure 8 are provided for discharging such loose soil or dirt from the trough 102. Such means comprise a transversely disposed and transversely inclined channel member 180 disposed beneath the trough 102 and the bottom 106 of the trough 102 being cut away as at 182 to open into the channel 180 so that loose soil within the trough 102 may fall into the channel 180 and be discharged from the trough 102.

As will be readily perceived upon inspection of Figure 1, the center of gravity of the loader 24 is disposed considerably to the rear of the tractor 10, and while it is contemplated that support wheels may be provided therefor, it is desired to leave the space under the loader 24 open so that loading receptacles may, if desired, be towed thereunder, means having been provided to compensate for this rearwardly spaced center of gravity and to move the same more nearly to the center of the tractor 10, which means take the form of a counterweight receiving platform 184 carried by the forward ends of the rails 26, which platform 184 is preferably provided with upstanding posts 186 to properly retain any suitable form of counterweight or ballast upon the platform 184.

Since, from the foregoing, the construction and advantages of mechanical sod cutter and loader are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having thus described the invention, what is claimed as new is:

1. A sod cutting machine comprising a wheeled support, a plow frame attached to said support, an elongated plow fork having a depending plow at its trailing end for horizontally severing sod, said plow including a bed inclined upwardly and rearwardly from the leading edge theerof to raise sod vertically upon severance thereof in response to forward movement of the wheeled support, means carried by the wheeled support for receiving sod severed and raised by the plow and elevating the sod to a position rearwardly of the wheeled support, said last means including an upwardly and rearwardly inclined trough having a bottom and side walls, said side walls being enlarged and divergent adjacent the forward end of the trough to constitute a training wall for sod received from the plow, a transverse trim roller carried at the forward end of the trough, conveyor belt rollers disposed at opposite ends of the trough, means for operatively connecting the wheeled support and one of the belt rollers, and a conveyor belt entrained over said belt rollers with the lower flight thereof disposed between the trough bottom and the trim roller.

2. A sod cutting machine comprising a wheeled support, a plow frame attached to said support, an elongated plow fork having a depending plow at its trailing end for horizontally severing sod, said plow including a bed inclined upwardly and rearwardly from the leading edge thereof to raise sod vertically upon severance thereof in response to forward movement of the wheeled support, means carried by the wheeled support for receiving sod severed and raised by the plow and elevating the sod to a position rearwardly of the wheeled support, said last means including an upwardly and rearwardly inclined trough having a bottom and side walls, said side walls being enlarged and divergent adjacent the forward end of the trough to constitute a training wall for sod received from the plow, a transverse trim roller carried at the forward end of the trough, conveyor belt rollers disposed at opposite ends of the trough, means for operatively connecting the wheeled support and one of the belt rollers, and a conveyor belt entrained over said belt rollers with the lower flight thereof disposed between the trough bottom and the trim roller, a transversely inclined cleaning trough secured to the under side of the trough bottom, and said trough bottom being cut away to open into the cleaning trough for discharge of loose soil therefrom.

3. The combination of claim 2, including a further conveyor extending substantially horizontally from the rear end of the inclined trough, and means carried by the plow frame at the opposite end of the wheeled support from the conveyor for counterbalancing the weight of the receiving and elevating means.

ARCHIE B. LANCASTER.

References Cited in the file of this patent

UNITED STATES PATENTS

| Number | Name | Date |
|---|---|---|
| 1,511,090 | Olmsted | Oct. 7, 1924 |
| 1,832,546 | Groop | Nov. 17, 1931 |
| 1,854,261 | Irwin | Apr. 19, 1932 |
| 1,880,611 | Vodon | Oct. 4, 1932 |
| 2,051,977 | Winston et al. | Aug. 25, 1936 |
| 2,060,688 | Pryor et al. | Nov. 10, 1936 |
| 2,401,653 | Mohler | June 4, 1946 |

FOREIGN PATENTS

| Number | Country | Date |
|---|---|---|
| 197,291 | Great Britain | Feb. 28, 1924 |